United States Patent
Chang et al.

(10) Patent No.: US 11,838,165 B2
(45) Date of Patent: Dec. 5, 2023

(54) METHOD FOR CONTROLLING A WIRELESS COMMUNICATION SYSTEM BY SELECTING LENGTHS OF A GUARD INTERVAL AND A LONG TRAINING FIELD

(71) Applicant: Realtek Semiconductor Corp., HsinChu (TW)

(72) Inventors: Wei-Hsuan Chang, HsinChu (TW); Chien-Hsun Liao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 20 days.

(21) Appl. No.: 17/715,053

(22) Filed: Apr. 7, 2022

(65) Prior Publication Data
US 2023/0144049 A1 May 11, 2023

(30) Foreign Application Priority Data
Nov. 8, 2021 (TW) ................. 110141465

(51) Int. Cl.
*H04L 27/26* (2006.01)
*H04W 84/12* (2009.01)

(52) U.S. Cl.
CPC ...... *H04L 27/2666* (2013.01); *H04L 27/2607* (2013.01); *H04W 84/12* (2013.01)

(58) Field of Classification Search
CPC ............ H04L 25/0216; H04L 27/2605; H04L 27/2607; H04L 27/2613; H04L 27/2646; H04L 27/2666; H04W 84/12
See application file for complete search history.

(56) References Cited

U.S. PATENT DOCUMENTS

| 10,911,279 B2 | 2/2021 | Bhanage |
| 2015/0071372 A1* | 3/2015 | Zhang ................ H04L 27/2602 375/295 |

* cited by examiner

Primary Examiner — Melvin C Marcelo
Assistant Examiner — Natali Pascual Peguero
(74) Attorney, Agent, or Firm — Winston Hsu

(57) ABSTRACT

A method used for controlling a wireless communication system includes receiving a packet, demodulating the packet to obtain a first channel characteristic index and a second channel characteristic index of the wireless communication system, selecting a length of a guard interval according to the first channel characteristic index, and selecting a length of a long training field according to the second channel characteristic index. When signal quality corresponding to the packet is higher, the length of the guard interval is shorter, and the length of the long training field is shorter.

7 Claims, 3 Drawing Sheets

METHOD FOR CONTROLLING A WIRELESS COMMUNICATION SYSTEM BY SELECTING LENGTHS OF A GUARD INTERVAL AND A LONG TRAINING FIELD

BACKGROUND OF THE INVENTION

1. Field of the Invention

The disclosure is related to a method for controlling a wireless communication system, and more particularly, a method for controlling a wireless communication system by selecting lengths of a guard interval and a long training field according to signal quality determined according to at least one channel characteristic index.

2. Description of the Prior Art

In a wireless communication system, the receiving end can receive signals through one or more paths. In order to avoid parsing errors caused by receiving a plurality of pieces of data at the same time, a waiting time can be set between sending two symbols, and the waiting time can be defined by setting the guard interval (GI).

In addition, in a wireless communication system, a preamble can be transmitted for channel estimation to obtain the frequency response of the channel. In the preamble, a long training field (LTF) can be set for channel estimation.

However, there is a lack of solution in this field to obtain a suitable length of the guard interval and the length of the long training field.

SUMMARY OF THE INVENTION

An embodiment provides a method for controlling a wireless communication system. The method includes receiving a packet; demodulating the packet to obtain a first channel characteristic index and a second channel characteristic index of the wireless communication system; selecting a length of a guard interval according to the first channel characteristic index; and selecting a length of a long training field according to the second channel characteristic index. When signal quality corresponding to the packet is higher, the length of the guard interval is shorter, and the length of the long training field is shorter.

Another embodiment provides a method for controlling a wireless communication system. The method includes receiving a packet; demodulating the packet to obtain a channel characteristic index of the wireless communication system; selecting a length of a guard interval according to the channel characteristic index; and selecting a length of a long training field according to the channel characteristic index. When signal quality corresponding to the packet is higher, the length of the guard interval is shorter, and the length of the long training field is shorter.

These and other objectives of the present invention will no doubt become obvious to those of ordinary skill in the art after reading the following detailed description of the preferred embodiment that is illustrated in the various figures and drawings.

DETAILED DESCRIPTION

In a wireless communication system, regarding the abovementioned guard interval, if the length of the guard interval is shorter, the packet transmission time can be reduced, and the throughput can be improved. However, if the guard interval is overly short, the signal transmitted will be distorted in a multiple path environment. A longer guard interval can help reducing intersymbol interference (ISI) to protect the signal from being distorted; however, If the guard interval is overly long, it will consume excessive channel capacity and decrease the transmission efficiency. Further, regarding the abovementioned long training field, if the length of the long training field is shorter, the packet transmission time can be reduced, and the throughput can be improved. However, if the long training field is overly short, the accuracy of the channel estimation will be reduced. If the long training field is overly long, it will consume excessive channel capacity and decrease the transmission efficiency.

Hence, by using the methods provided by embodiments, the lengths of the guard interval and the long training field can be dynamically selected to reduce the packet transmission time, improve the throughput, avoid signal distortion, and keep the accuracy of the channel estimation.

Figure 1:
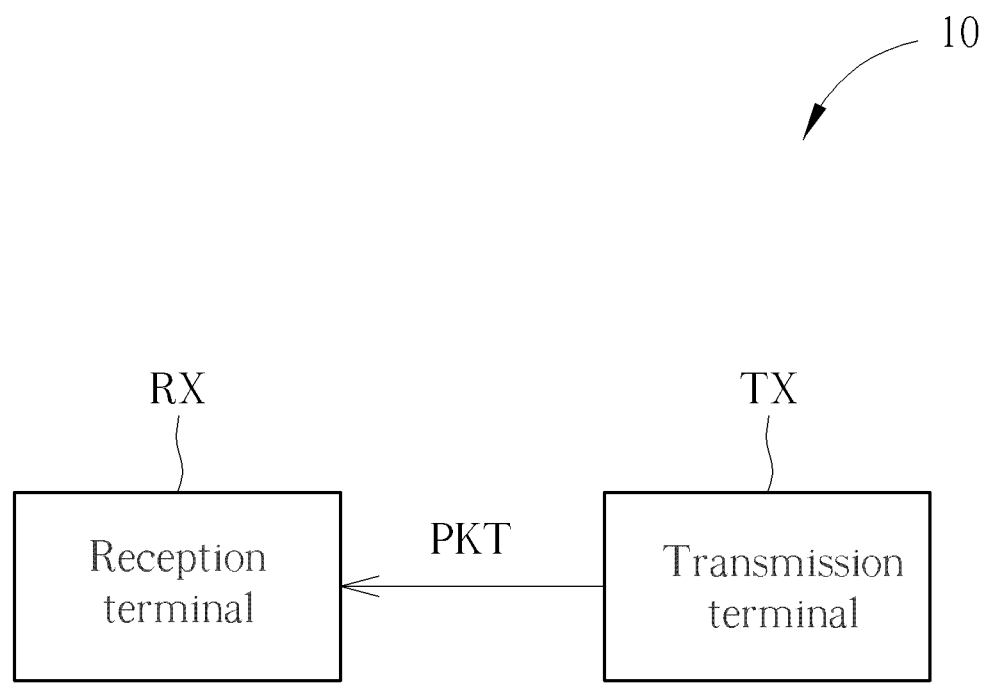
FIG. 1 illustrates a wireless communication system according to an embodiment.
Figure 2:
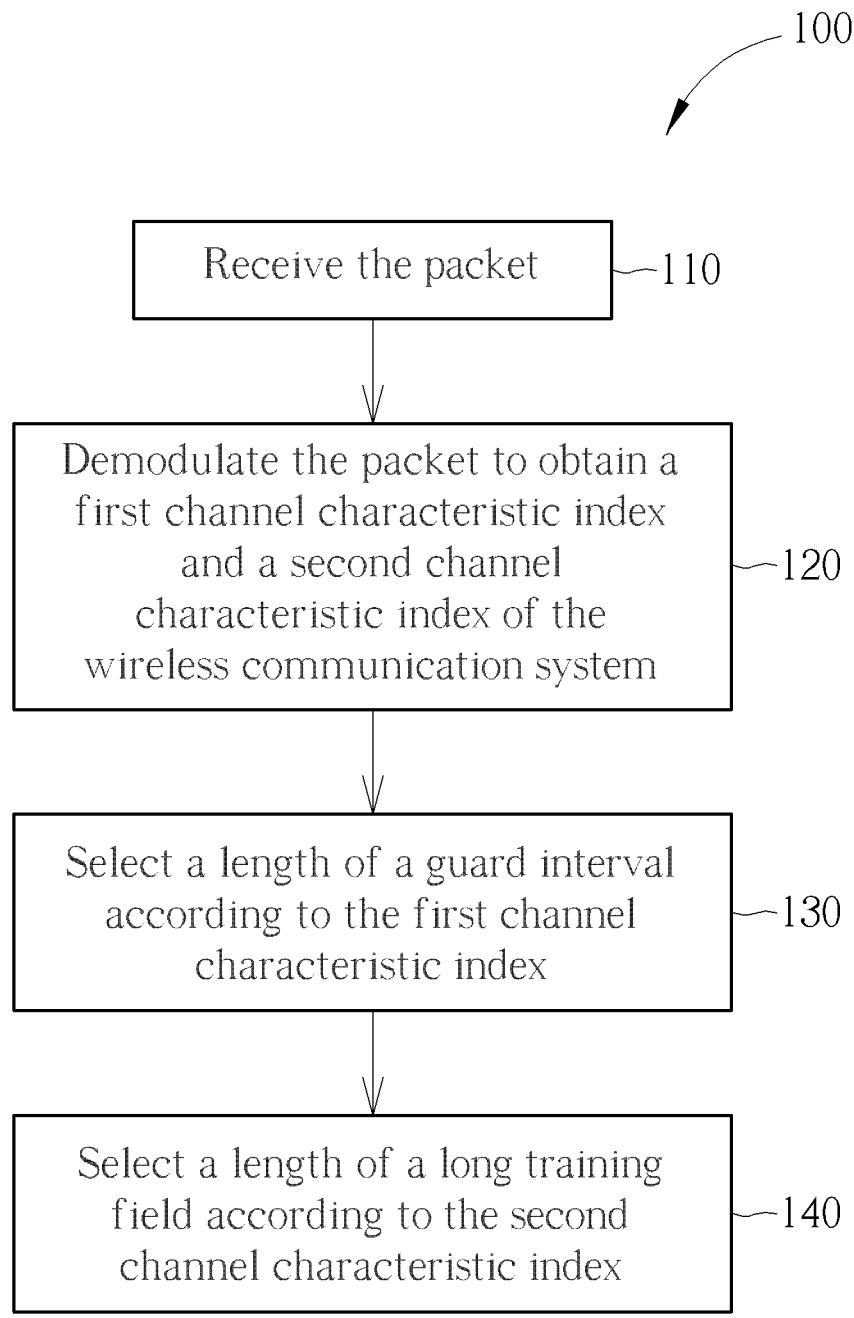
FIG. 2 illustrates a flowchart of a method for controlling the wireless communication system of FIG. 1.

FIG. 1 illustrates a wireless communication system 10 according to an embodiment. As shown in FIG. 1, in the wireless communication system 10, a packet PKT can be transmitted from the transmission terminal TX to the reception terminal RX. For example, the transmission terminal TX can be a station (STA), and the reception terminal RX can be a wireless access point (AP). For example, in the wireless communication system 10, an orthogonal frequency division multiplexing (OFDM) system can be used. FIG. 2 illustrates a flowchart of a method 100 for controlling the wireless communication system 10 of FIG. 1. The method 100 can include the following steps.

Step 110: receive the packet PKT;
Step 120: demodulate the packet PKT to obtain a first channel characteristic index and a second channel characteristic index of the wireless communication system 10;
Step 130: select a length of a guard interval according to the first channel characteristic index; and
Step 140: select a length of a long training field according to the second channel characteristic index.

In Step 110 and Step 130, the first channel characteristic index and the second channel characteristic index can be obtained by demodulating the received packet PKT. The first channel characteristic index and the second channel characteristic index can be related to the channel quality related to the packet PKT.

In FIG. 1 and FIG. 2, when the channel quality and the channel robustness corresponding to the packet PKT are better, the guard interval selected in Step 130 can be shorter, and the long training field selected in Step 140 can be shorter. According to an embodiment, the first channel characteristic index mentioned in Step 120 can include a time-delay spread value.

In the text, the first channel characteristic index can be expressed as Index1, the second channel characteristic index can be expressed as Index2, the guard interval can be expressed as GI, and the long training field can be expressed as LTF. According to an embodiment, the long training field mentioned in the text can be a high efficiency long training field (HE-LTF).

Table 1 describes the length of the guard interval GI selected according to the first channel characteristic index Index1 according to an embodiment. In Table 1, a first threshold can be expressed as TH_0, and a second threshold can be expressed as TH_1. Table 1 can be related to the Step 130 of FIG. 2.

TABLE 1

| Condition | Selected length of the guard interval | Note |
|---|---|---|
| Index1 < TH_0 | GI = GI1 | The quality of the received signal is the highest, and the selected guard interval is the shortest. |
| TH_0 ≤ Index1 < TH_1 | GI = GI2 | The quality of the received signal is the second highest, and the selected guard interval is the second shortest. |
| TH_1 ≤ Index1 | GI = GI3 | The quality of the received signal is the lowest, and the selected guard interval is the longest. |

Note:
TH_1 > TH_0, and GI3 > GI2 > GI1

As shown in Table 1, the length of the guard interval GI is a first length GI1 when the first channel characteristic index Index1 is lower than the first threshold TH_0, and it can expressed as GI=GI1 when Index1<TH_0.

As shown in Table 1, the length of the guard interval GI is a second length GI2 when the first channel characteristic index Index1 is between the first threshold TH_0 and the second threshold TH_1, and it can expressed as GI=GI2 when TH 0≤Index1<TH_1.

As shown in Table 1, the length of the guard interval GI is a third length GI3 when the first channel characteristic index Index1 is higher than the second threshold TH_1, and it can expressed as GI=GI3 when TH 1≤Index1.

In Table 1, the second threshold TH_1 is higher than the first threshold TH_0, the third length GI3 is greater than the second length GI2, the second length GI2 is greater than the first length GI1, and it can be expressed as TH_1>TH_0 and GI3>GI2>GI1.

In Table 1, when the first channel characteristic index Index1 is lower than the first threshold TH_0 (Index1<TH_0), the signal quality corresponding to the packet PKT is the highest. When the first channel characteristic index Index1 is between the first threshold TH_0 and the second threshold TH_1 (TH_0≤Index1<TH_1), the signal quality corresponding to the packet PKT is the second highest. When the first channel characteristic index Index1 is higher than the second threshold TH_1 (TH_1≤Index1), the signal quality corresponding to the packet PKT is the lowest.

According to an embodiment, in Table 1, the first length GI1 of the guard interval GI can be substantially equal to the first threshold TH_0, and the second length GI2 of the guard interval GI can be substantially equal to the second threshold TH_1. For example, in the wireless communication applications of Wi-Fi 6 and Wi-Fi 7, the first length GI1 can be 0.8 microseconds (μs), the second length GI2 can be 1.6 microseconds, the third length GI3 can be 3.2 microseconds. The first threshold TH_0 of the first channel characteristic index Index1 (e.g., a time-delay spread value) can be 0.8 microseconds, and the second threshold TH_1 can be 1.6 microseconds.

Regarding the long training field, according to an embodiment, the second channel characteristic index Index2 mentioned in Step 120 of FIG. 2 can include a signal-to-noise ratio (SNR). According to an embodiment, the second channel characteristic index Index2 can include a moving average SNR.

Table 2 describes the long training field LTF selected according to the second channel characteristic index Index2 according to an embodiment. In Table 2, a first threshold can be expressed as TH_0, and a second threshold can be expressed as TH_1. Table 2 can be related to the Step 140 of FIG. 2.

TABLE 2

| Condition | Selected length of the long training field | Note |
|---|---|---|
| Index2 < TH_0 | LTF = LTF3 | The quality of the received signal is the lowest, and the selected long training field is the longest. |
| TH_0 ≤ Index2 < TH_1 | LTF = LTF2 | The quality of the received signal is the second lowest, and the selected long training field is the second longest. |
| TH_1 ≤ Index2 | LTF = LTF1 | The quality of the received signal is the highest, and the selected long training field is the shortest. |

Note:
TH_1 > TH_0, and LTF3 > LTF2 > LTF1

As shown in Table 2, the length of the long training field LTF can be a third length LTF3 when the second channel characteristic index Index2 is lower than the first threshold TH_0, and it can be expressed as LTF=LTF3 when Index2<TH_0.

As shown in Table 2, the length of the long training field LTF can be a second length LTF2 when the second channel characteristic index Index2 is between the first threshold TH_0 and a second threshold TH_1, and it can expressed as LTF=LTF2 when TH_0≤Index2<TH_1.

As shown in Table 2, the length of the long training field LTF can be a first length LTF1 when the second channel characteristic index Index2 is higher than the second threshold TH_1, and it can be expressed as LTF=LTF1 when TH_1≤Index2.

In Table 2, the second threshold TH_1 can be higher than the first threshold TH_0, the third length LTF3 can be greater than the second length LTF2, the second length LTF2 can be greater than the first length LTF1, and it can be expressed as TH_1>TH_0 and LTF3>LTF2>LTF.

According to an embodiment, the first length LTF1 can be a length of a regular long training field and expressed as 1×. The second length LTF2 can be twice the first length LTF1 and expressed as 2×. The third length LTF3 can be four times the first length LTF1 and expressed as 4×. For example, the first length LTF1 (1×) can be 3.2 microseconds, the second length LTF2 (2×) can be 6.4 microseconds, and third length LTF3 (4×) can be 12.8 microseconds.

A high efficiency long training field (HE-LTF) can be used for channel estimation. For example, when a 1×HE-LTF (e.g., with a length of 3.2 microseconds) is used, one channel estimation result can be generated with one subcarrier of four subcarriers, and the interpolation calculations have to be performed to generate the estimation results with the other three subcarriers. Hence, if the channel response varies less, the results generated by the interpolation calculations can be better approximated to the real channel estimation results. In another scenario, if the channel response varies more, a 2×HE-LTF (e.g., with length of 6.4 microseconds) or a 4×HE-LTF (e.g., with length of 12.8 microseconds) can be used to generate more accurate channel estimation results. Hence, according to an embodiment, a proper length of the long training field can be selected according to the quality of the received signal.

For example, when the bandwidth is 20 MHz, according to the receiver minimum input level sensitivity of the 802.11ax (WiFi 6) standard, in Table 2, the second threshold TH_1 can be 28 dB (with a sensitivity requirement between −54 dBm and −82 dBm), and the first threshold TH_0 can be 16 dB (with a sensitivity requirement between −66 dBm and −82 dBm). In the text, MHz can mean megahertz, dB can mean decibel(s), and dBm can mean decibel-milliwatt(s).

For example, when the bandwidth is 40 MHz, according to the receiver minimum input level sensitivity of the 802.11ax (WiFi 6) standard, in Table 2, the second threshold TH_1 can be 31 dB (with a sensitivity requirement between −51 dBm and −82 dBm), and the first threshold TH_0 can be 19 dB (with a sensitivity requirement between −63 dBm and −82 dBm).

For example, when the bandwidth is 80 MHz, according to the receiver minimum input level sensitivity of the 802.11ax (WiFi 6) standard, in Table 2, the second threshold TH_1 can be 34 dB (with a sensitivity requirement between −48 dBm and −82 dBm), and the first threshold TH_0 can be 22 dB (with a sensitivity requirement between −60 dBm and −82 dBm).

For example, when the bandwidth is 160 MHz or 80+80 MHz, according to the receiver minimum input level sensitivity of the 802.11ax (WiFi 6) standard, in Table 2, the second threshold TH_1 can be 37 dB (with a sensitivity requirement between −45 dBm and −82 dBm), and the first threshold TH_0 can be 25 dB (with a sensitivity requirement between −57 dBm and −82 dBm). The bandwidth of 80+80 MHz can be used through the transmission combination of two 80 MHz channels.

According to another embodiment, the second channel characteristic index (expressed as Index2) of Step 120 of FIG. 2 can be corresponding to a speed of channel variation, as shown in Table 3. Table 3 describes the long training field LTF selected according to the speed of channel variation. In Table 3, a first threshold can be expressed as TH_0, and a second threshold can be expressed as TH_1. Table 3 can be related to the Step 140 of FIG. 2.

TABLE 3

| Condition | Selected length of the long training field | Note |
| --- | --- | --- |
| Index2 < TH_0 | LTF = LTF1 | The quality of the received signal is the highest, and the selected long training field is the shortest. |
| TH_0 ≤ Index2 < TH_1 | LTF = LTF2 | The quality of the received signal is the second highest, and the selected long training field is the second shortest. |
| TH_1 ≤ Index2 | LTF = LTF3 | The quality of the received signal is the lowest, and the selected long training field is the longest. |

Note:
The second channel characteristic index Index2 is corresponding to the speed of channel variation.
TH_1 > TH_0, and LTF3 > LTF2 > LTF1.

As shown in Table 3, the length of the long training field LTF can be a first length LTF1 when the speed of channel variation is lower than a first threshold TH_0, and it can expressed as LTF=LTF1 when Index2<TH_0.

As shown in Table 3, the length of the long training field LTF can be a second length LTF2 when the speed of channel variation is between the first threshold TH_0 and a second threshold TH_1, and it can expressed as LTF=LTF2 when TH_0≤Index2<TH_1.

As shown in Table 3, the length of the long training field LTF can be a third length LTF3 when the speed of channel variation is higher than the second threshold TH_1, and it can expressed as LTF=LTF3 when TH_1≤Index2.

In Table 3, the second threshold TH_1 can be higher than the first threshold TH_0, the third length LTF3 can be greater than the second length LTF2, and the second length LTF2 can be greater than the first length LTF1. It can be expressed as TH_1>TH_0 and LTF3>LTF2>LTF1. As shown in Table 3, when the speed of channel variation is higher, the signal quality is lower, and the selected long training field LTF can be longer. In other words, when the speed of channel variation is lower, the signal quality is lower, and the selected long training field LTF can be shorter.

According to an embodiment, each of the first channel characteristic index and the second channel characteristic index can be corresponding to a signal-to-noise ratio (SNR) and/or a received signal strength indication (RSSI). In other words, the signal quality can be known according to a signal-to-noise ratio (SNR) and/or a received signal strength indication (RSSI), and the lengths of the guard interval and the long training field can be selected according to the signal quality.

Below, an example is provided to describe the application according to an embodiment. If the time-delay spread value is shorter, for example, than the symbol duration of the signal, the channel can be more like a flat fading channel, and a high efficiency long training field (HE-LTF) with a short duration can be selected. In another scenario, if the time-delay spread value is longer, for example, than the symbol duration of the signal, the channel can be more like a frequency selective fading channel, and a high efficiency long training field (HE-LTF) with a longer duration can be selected.

In general, when the signal quality is higher, the delay spread can be lower, and the channel fading type can be more approximated to a flat fading type. In another scenario, when the signal quality is lower, the delay spread can be higher, and the channel fading type can be more approximated to a frequency selective fading type. Hence, as mentioned above, the lengths of the guard interval and the long training field can be dynamically selected according to channel quality.

Figure 3:
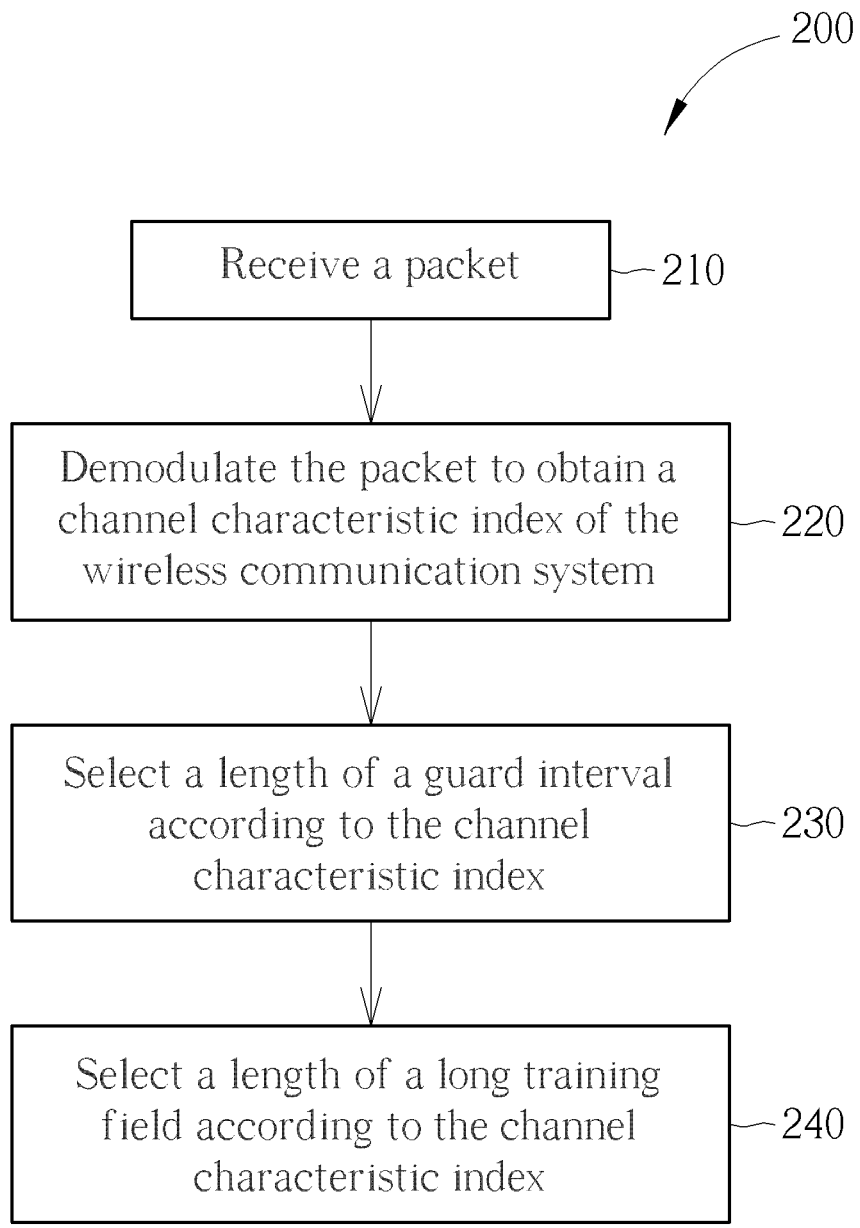
FIG. 3 illustrates a flowchart of a method for controlling the wireless communication system of FIG. 1 according to another embodiment.

FIG. 3 illustrates a flowchart of a method 200 for controlling the wireless communication system 10 of FIG. 1 according to another embodiment. The method 200 can include the following steps.

Step 210: receive a packet PKT;
Step 220: demodulate the packet PKT to obtain a channel characteristic index of the wireless communication system 10;
Step 230: select a length of a guard interval according to the channel characteristic index; and
Step 240: select a length of a long training field according to the channel characteristic index.

In FIG. 3, when signal quality corresponding to the packet PKT is higher, the length of the guard interval can be shorter, and the length of the long training field can be shorter. Step 210 to Step 240 of FIG. 3 can be similar to Step 110 to Step 140 of FIG. 2. However, in FIG. 3, the same channel characteristic index can be used for selecting the lengths of the guard interval and the long training field according to the signal quality.

In summary, by means of the methods for controlling the wireless communication system provided by embodiments, the lengths of the guard interval and the long training field can be dynamically selected by comparing the channel characteristic index with the thresholds. A solution is provided to reduce the transmission time of packet, increase the throughput, and keep the accuracy of channel estimation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a wireless communication system, comprising:
   receiving a packet;
   demodulating the packet to obtain a first channel characteristic index and a second channel characteristic index of the wireless communication system;
   selecting a length of a guard interval according to the first channel characteristic index; and
   selecting a length of a long training field according to the second channel characteristic index;
   wherein:
   when signal quality corresponding to the packet is higher, the length of the guard interval is shorter, and the length of the long training field is shorter;
   the length of the guard interval is a first length when the first channel characteristic index is lower than a first threshold;
   the length of the guard interval is a second length when the first channel characteristic index is between the first threshold and a second threshold;
   the length of the guard interval is a third length when the first channel characteristic index is higher than the second threshold; and
   the second threshold is higher than the first threshold, the third length is greater than the second length, and the second length is greater than the first length.

2. The method of claim 1, wherein the first channel characteristic index comprises a time-delay spread value.

3. The method of claim 2, wherein the first length is substantially equal to the first threshold, and the second length is substantially equal to the second threshold.

4. A method for controlling a wireless communication system, comprising:
   receiving a packet;
   demodulating the packet to obtain a first channel characteristic index and a second channel characteristic index of the wireless communication system;
   selecting a length of a guard interval according to the first channel characteristic index; and
   selecting a length of a long training field according to the second channel characteristic index;
   wherein:
   when signal quality corresponding to the packet is higher, the length of the guard interval is shorter, and the length of the long training field is shorter;
   the length of the long training field is a third length when the second channel characteristic index is lower than a first threshold;
   the length of the long training field is a second length when the second channel characteristic index is between the first threshold and a second threshold;
   the length of the long training field is a first length when the second channel characteristic index is higher than the second threshold; and
   the second threshold is higher than the first threshold, the third length is greater than the second length, and the second length is greater than the first length.

5. The method of claim 4, wherein the second channel characteristic index comprises a signal-to-noise ratio.

6. The method of claim 4, wherein each of the first channel characteristic index and the second channel characteristic index is corresponding to a signal-to-noise ratio and/or a received signal strength indication (RSSI).

7. A method for controlling a wireless communication system, comprising:
   receiving a packet;
   demodulating the packet to obtain a first channel characteristic index and a second channel characteristic index of the wireless communication system;
   selecting a length of a guard interval according to the first channel characteristic index; and
   selecting a length of a long training field according to the second channel characteristic index;
   wherein:
   when signal quality corresponding to the packet is higher, the length of the guard interval is shorter, and the length of the long training field is shorter;
   the second channel characteristic index is corresponding to a speed of channel variation;
   the length of the long training field is a first length when the speed of channel variation is lower than a first threshold;
   the length of the long training field is a second length when the speed of channel variation is between the first threshold and a second threshold;
   the length of the long training field is a third length when the speed of channel variation is higher than the second threshold; and
   the second threshold is higher than the first threshold, the third length is greater than the second length, and the second length is greater than the first length.

* * * * *